United States Patent
Yost et al.

(10) Patent No.: US 9,477,786 B2
(45) Date of Patent: Oct. 25, 2016

(54) SYSTEM FOR METADATA MANAGEMENT

(71) Applicant: Ab Initio Technology LLC, Lexington, MA (US)

(72) Inventors: Gregg Yost, Waltham, MA (US); Dusan Radivojevic, North Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 258 days.

(21) Appl. No.: 14/208,016

(22) Filed: Mar. 13, 2014

(65) Prior Publication Data

US 2014/0279979 A1    Sep. 18, 2014

Related U.S. Application Data

(60) Provisional application No. 61/790,074, filed on Mar. 15, 2013.

(51) Int. Cl.
   *G06F 17/30* (2006.01)
(52) U.S. Cl.
   CPC .............................. *G06F 17/30994* (2013.01)
(58) Field of Classification Search
   CPC ................... G06F 17/30309; G06F 17/30958; G06F 17/30994
   USPC ....... 707/603, 687, 690, 695, 798, 802, 804, 707/805, 806, 829
   See application file for complete search history.

(56) References Cited

U.S. PATENT DOCUMENTS

| | | | |
|---|---|---|---|
| 8,266,122 B1 | 9/2012 | Newcombe et al. | |
| 8,819,010 B2* | 8/2014 | Fankhauser | G06F 17/30286 707/736 |
| 2009/0216728 A1 | 8/2009 | Brainerd et al. | |
| 2010/0223430 A1 | 9/2010 | Walker et al. | |
| 2012/0310875 A1 | 12/2012 | Prahlad et al. | |
| 2013/0332423 A1* | 12/2013 | Puri | G06F 17/30309 707/687 |
| 2014/0019423 A1* | 1/2014 | Liensberger | G06F 17/30309 707/690 |
| 2014/0114907 A1* | 4/2014 | Kozina | G06F 17/30592 707/602 |

OTHER PUBLICATIONS

Todd et al., Scientific Lineage and Object-Based Storage Systems, 2009 5th IEEE International Conference on E-Science Workshops Year: 2009, pp. 52-58, DOI: 10.1109/ESCIW.2009.5408005.*
International Search Report and Written Opinion, related application PCT/US 14/26133, mailed Aug. 21, 2014 ( 9 pages).

* cited by examiner

*Primary Examiner* — Greta A Robinson
(74) *Attorney, Agent, or Firm* — Fish & Richardson P.C.

(57) ABSTRACT

Methods, systems, and apparatus, including computer programs encoded on computer storage media, for metadata management. One of the methods includes receiving user input selecting a first node. The method includes receiving a first data lineage of a first object, the first object having a type, the first data lineage describing relationships between the first object and one or more datasets or transforms. The method includes receiving user input selecting a second node. The method includes receiving a second data lineage of a second object, the second object having the same type as the first object. The method includes performing a comparison of the first node and the first data lineage to the second node and the second data lineage. The method includes generating a report based on the comparison.

28 Claims, 10 Drawing Sheets

|   | Customer.dat | Customer.dat(2) |
|---|---|---|
| 1 | Main_city | Main_city |
| 2 | Main_postcode | |
| 3 | Main_address | Main_address |
| 4 | Cust_birthday | Cust_Birthday |
| 5 | Main_state | Main_state |
| 6 | | Main_zipcode |
| 7 | Customer_id | Customer_id |

FIG. 3B

| | Name | Cust_birthday | Cust_Birthday(2) |
|---|---|---|---|
| 1 | DataSet | "Clean_cust.dat" | "Customer.dat" |
| 2 | Default Value | 1/1/1900 | |
| 3 | Description | "Customer Birthday" | "Customer Birthday" |
| 4 | Native Type | Date("MM/DD/YYYY") | Date("YYYY-MM-DD") |
| 5 | Nullable | True | True |
| 6 | Business Term | Birthday | Birthday |

FIG. 3D

SYSTEM FOR METADATA MANAGEMENT

CLAIM OF PRIORITY

This application claims priority under 35 USC §119(e) to U.S. Patent Application Ser. No. 61/790,074, filed on Mar. 15, 2013, the entire contents of which are hereby incorporated by reference.

BACKGROUND

This description relates to a system for maintaining and comparing multiple versions of a data processing system.

Enterprises use complex data processing systems, such as data warehousing, customer relationship management, and data mining, to manage data. In many data processing systems, data are pulled from many different data sources, such as database files, operational systems, flat files, the Internet, etc., into a central repository. Often, data are transformed before being loaded in the data system. Transformation may include cleansing, integration, and extraction. To keep track of data, its sources, and the transformations that have happened to the data stored in a data system, metadata can be used. Metadata (sometimes called "data about data") are data that describe other data's attributes, format, origins, histories, inter-relationships, etc. Metadata management can play a central role in complex data processing systems.

Sometimes a database user may want to investigate how certain data are derived from different data sources. For example, a database user may want to know how a dataset or data object was generated or from which source a dataset or data object was imported. Tracing a dataset back to sources from which it is derived is called data lineage tracing (or "upstream data lineage tracing"). Sometimes a database user may want to investigate how certain datasets have been used (called "downstream data lineage tracing" or "impact analysis"), for example, which application has read a given dataset. A database user may also be interested in knowing how a dataset is related to other datasets. For example, a user may want to know if a dataset is modified, what output tables will be affected.

SUMMARY

In general, one innovative aspect of the subject matter described in this specification can be embodied in methods that may include the actions of receiving user input selecting a first node in a first graph that includes nodes. The methods also includes the actions of receiving a first data lineage of a first object associated with the first node, the first object having a type, the first data lineage describing relationships between the first object and one or more datasets or transforms. The methods also include receiving user input selecting a second node from second graph that includes nodes. The methods also include the actions of receiving a second data lineage of a second object associated with the second node, the second object having the same type as the first object, the second data lineage describing relationships between the first object and one or more other datasets or transforms. The methods also include the actions of performing a comparison of the first node and the first data lineage to the second node and the second data lineage. The methods also include the actions of generating a report based on the comparison.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The type of the first node may be one of the group consisting of a field of a dataset, a column of a dataset, a dataset, or a transformation. The graph may include nodes representing components of the data processing system and directed edges representing data flows between components of the data processing system. The differences may be limited to structural differences in between the first object and the second object. The first object may be a first version of an object and the second object is a second version of the object. The methods may also include accessing the first version of the object using a unique tag for the first version of object and a look-up table. The methods may also include accessing the second version of the object using a unique tag for the second version of the object and a look-up table. The first version of the object and the second version of the object may have an ancestor-descendant relationship in a revision history. The first version of the object and the second version of the object may have a common ancestor in a revision history, but neither version of the object is a descendent of the other version of the object. The first version of the object and the second version of the object may describe concurrently employed implementations of the data processing system.

Aspects can include one or more of the following advantages. Some implementations may enable impact analysis of changes in multi-component data processing systems. Some implementations may facilitate comparison of alternate versions of a multi-component data processing system. Some implementations may facilitate maintenance of complex multi-component data processing systems. Some implementations may reduce development and maintenance costs for multi-component data processing systems.

Other features and advantages of the invention will become apparent from the following description, and from the claims.

DESCRIPTION OF DRAWINGS

FIG. 3B illustrates an example of a report that compares two datasets.

FIG. 3D illustrates an example of a report that compares fields or columns.

DESCRIPTION

Metadata is data that describes data. Metadata can be technical, that is, it can describe the specification of data structures, for example, a record format of a data structure, a size of an image, or a color depth of the image. Metadata can also be business related, that is, it can provide non-structural information about the data, for example, a system of record for the data structure, a time the image was taken, a name of the photographer, etc.

Metadata may change in response to changes to the underlying systems or data sources. A system may store multiple versions of metadata. A user may wish to compare changed metadata to a previous version of metadata or between multiple versions of metadata.

Some implementations provide for comparing multiple versions of metadata for multi-component computing systems with inter-component dependencies. Users are enabled to assess the system-wide impact of changes between versions. Branched or concurrent (e.g., representing instances of a data processing system that are deployed in different geographic areas) versions of the metadata may be compared using some of these techniques. Data lineages for multiple versions of metadata may be compared in a single interface. For example, a graphical representation of a data lineage may be color coded to indicate which components in a computing system described by the metadata versions are the same or different between the versions. System-level impact may be further emphasized with coding (e.g., color coding) to indicate when the output of a component, but not the component itself, is changed by an upstream change.

The comparison of data lineages may also be represented in a tabular listing of system components that reflects the dependencies among the components. Structural comparison (e.g., to distinguish impactful changes from changes to comments) of the metadata may also be enabled. In some implementations, each version of metadata has a unique version tag that is mapped to various system components using a look-up table.

Figure 1:
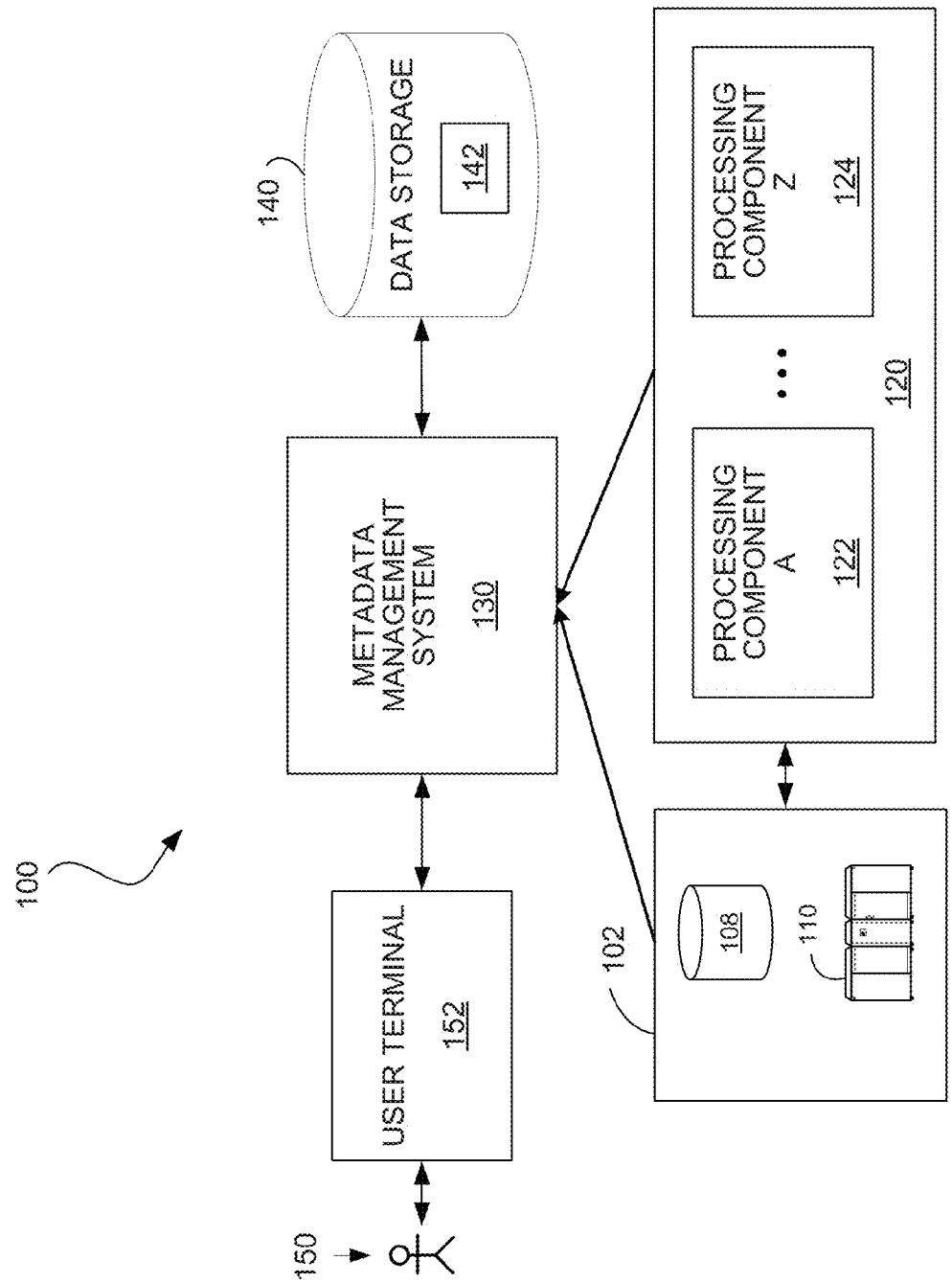
FIG. 1 is a block diagram of a system for managing metadata for multiple versions of a data processing system.

FIG. 1 is a block diagram of a system for managing metadata for multiple versions of a data processing system. The environment 100 includes a data source 102 that may include one or more sources of data such as storage devices or connections to online data streams, each of which may store data in any of a variety of storage formats (e.g., database tables, spreadsheet files, flat text files, or a native format used by a mainframe). A data processing system 120 includes data processing components (processing component A 122, . . . , processing component Z 124). The data processing system 120 may be hosted on one or more general-purpose computers under the control of a suitable operating system, such as the UNIX operating system. For example, the a processing component (e.g., processing component A 122) in the data processing system 120 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

In some implementations, the data processing system is heterogeneous in the sense that it includes processing components based on different technologies (e.g., software written in different programming languages or modules hosted by separate computing devices running different operating systems, etc.)

The data processing system 120 accesses data from data source 102, processes the data using its processing components (e.g., 122 and 124) to generate output data. The output data may be stored and/or consumed directly by a user of the data processing system 120. In some implementations, output data may be exported, e.g., written back to one or more of the data sources of data source 102 or written out to any other data sink.

A metadata management system 130 collects metadata describing the operation of the data processing system 120 and/or its external data sources 102. Metadata describing the components (e.g., processing component A 122 and/or external mainframe data source 110) of the data processing system 120 may be stored as metadata object records in relational database 142 on data storage system 140. The metadata management system 130 maintains the metadata describing one or more versions of the data processing system, including descriptions of its external data sources 102, and enables users (e.g., user 150) to interact with the metadata through a user interface of a user terminal 152. For example, the user terminal 152 may include a graphical user interface that user 150 uses to interact with the metadata management system 120. Users may be able to query and/or edit the metadata describing components of various versions of the data processing system 120.

One of the functions that the metadata management system 130 provides to user 150 is the ability to generate and review data lineage representations (e.g., data lineage graphs, data lineage tables, or other representations reflecting dependencies among components of the data processing system 120).

In some examples, data storage 140 may include both a base data store and an interface data store. The base data store may store technical metadata, and may include applications along with their associated metadata, such as graphs and transforms. In addition to storing technical metadata, the base data store may also perform various kinds of analysis including dependency analysis (e.g., computing data lineage, as described in more detail below), or may receive and store the results of such analysis. In some examples, base data store and interface data store may be combined and implemented as a single data store.

While technical metadata is useful to developers in a variety of functions, there are many instances in which a higher level of metadata needs to be analyzed and manipulated. This higher level metadata sometimes referred to as "enterprise" or "business" metadata is often useful in data analysis. Some examples of business metadata include data stewardship, which indicates which employee is responsible for the data, and data dictionaries, which are business definitions for files and fields within files. Business metadata goes beyond technical descriptions of data, and can be stored on a platform that is separate from the base data store, such as an interface data store.

The information stored in the data storage 140 in the form of metadata objects enables various kinds of analysis about applications and the data processed by those applications. For example, as discussed further below, a user can obtain answers to questions about data lineage (e.g., Where did a given value come from? How was the output value computed? Which applications produce and depend on this data?). A developer can understand the consequences of proposed modifications (e.g., If this piece changes, what else will be affected? If this source format changes, which applications will be affected?). A user/developer can also obtain questions to answers involving both technical metadata and business metadata (e.g., which groups are responsible for producing and using this data? Who changed this application last? What changes did they make?).

The data storage 140 is able to track the state of stored metadata objects. Objects stored in the data storage 140 are versioned, making it possible to examine the state of things as of last week, last month, or last year, and to compare it with the state of things today. The data storage 140 can collect job-tracking, or execution information which enables trend analysis (e.g., How fast is our data growing?) and capacity planning (e.g., How long did that application take to run? How much data did it process, and at what rate? What resources did the application consume? When will we need to add another server?).

In some cases, relationships (such as lineage information) can be extracted from the data storage 140, or from other sources of data. The interface data store may hold a high-level summary of data lineage. The lineage information (or other data dependency analysis) can be computed automatically within the system 100, or can be received from an external system, or from manual input. For example, the system 100 can receive lineage information that has been gathered and prepared by humans analyzing the code. The lineage information can be imported into the data storage 140 from files in any of a variety of predetermined formats (e.g., in spreadsheets).

For example, a data lineage representation displays the end-to-end lineage for the data and/or processing nodes that represent the metadata objects stored in the data storage 140; that is, the objects a given starting object depends on (its sources) and the objects that a given starting object affects (its targets). In some implementations, data lineage representations may be generated that reflect differences between two or more versions of metadata describing the data processing system 120. For example, representations of a component (e.g., a node in a graph or one or more cells in a table) may be color coded to reflect differences between two versions for that component. For example, overlaying difference information for two versions on a representation of data lineage may allow a user to more easily assess the system wide impact of switching between two versions of the data processing system 120. This in turn may reduce maintenance costs and potential system down time for the data processing system.

Storage devices providing the data source 102 may be local to the data processing system 120, for example, being stored on a storage medium (e.g., hard drive 108) connected to a computer running one or more processing components of the data processing system 120, or may be remote to the data processing system 120, for example, being hosted on a remote system (e.g., mainframe 110) in communication with a computer running one or more processing components of the data processing system 120, over a remote connection. In some implementations, one or more data source devices in data source 102 are external to the data processing system 120 in the sense that they are operated by a distinct entity and the metadata available for them describes only information needed to identify the data source and allow the data processing system 120 to extract data from them (e.g., limited to identification and application programming interface (API) information).

Figure 2A:
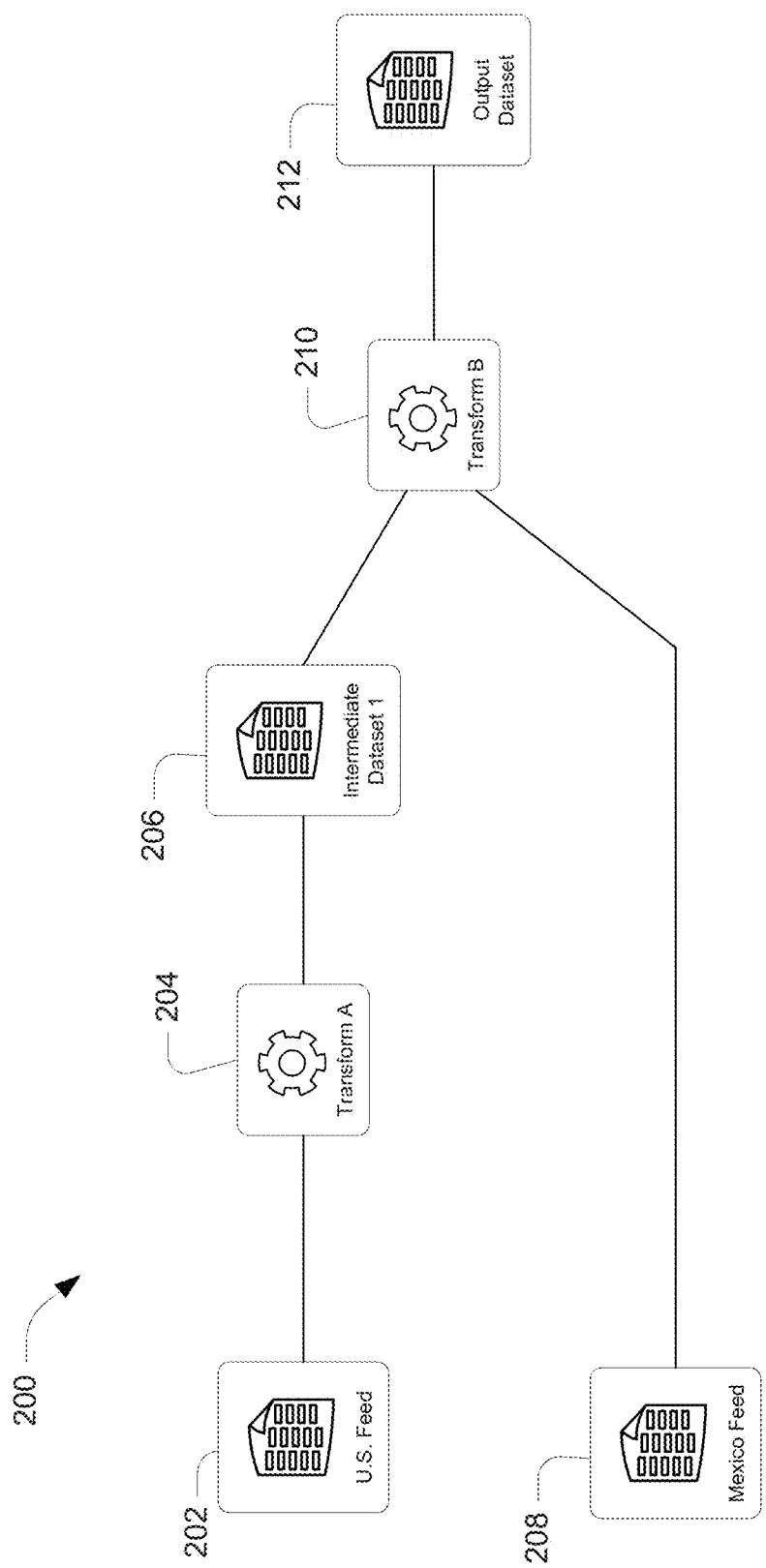
FIGS. 2A-2C illustrates an example of a data lineage graph reflecting differences between two versions metadata describing a data processing system.

FIG. 2A shows a schematic diagram of a first version of an example data lineage graph 200. The graph illustrates dependency relationships between data stores and transforms. Data is passed through a sequence of data processing components represented by nodes of data lineage graph that processes a flow of data from one or more data sources to one or more data sinks (collectively data stores). Any of the various data processing components in the underlying data processing system can be implemented by processes running on separate processing devices, or multiple data processing components may be implemented by one or more processes running on a single processing device. In some implementations, the input data records may be processed continuously as they arrive (e.g., in response to a request for a credit card transaction). In some implementations, data may be processed in batches that identify a set of input data records to be processed by the system reflected by the data lineage graph 200.

In this example, a data source "U.S. Feed" 202 provides data to a "Transform A" 204 transform. The Transform A 204 performs operations on the data provided by the "U.S. Feed" 202 and stores the result in the "Intermediate Dataset 1" 206 data store. The Intermediate Dataset 1 206 data store and the "Mexico Feed" 208 data store provide data to the "Transform B" 210 transform. The Transform B 210 transform uses the data provided from the Mexico Feed 208 and the Intermediate Dataset 1 206 and stores the result in "Output DataSet" 212 data store.

Figure 2B:
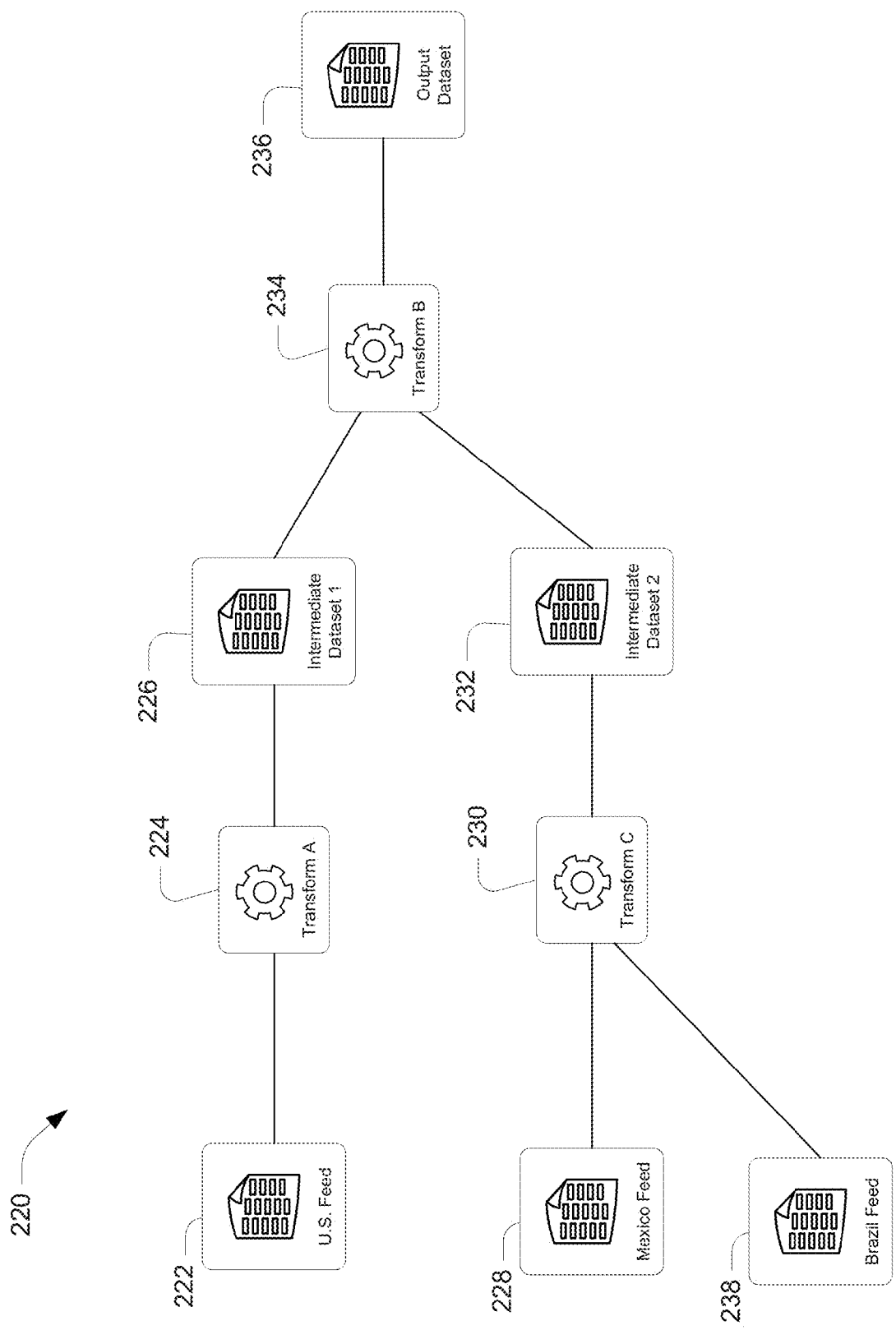

FIG. 2B show a schematic diagram of a second version of an example data lineage graph 220. The second version may be a later or updated version of the first version of the data lineage graph described above with respect to FIG. 2A. The second version may also be a data lineage may parallel the first version of the data lineage.

In this example, a data source "U.S. Feed" 222 provides data to a "Transform A" 224 transform. The Transform A 224 performs operations on the data provided by the "U.S. Feed" 222 and stores the result in the "Intermediate Dataset 1" 226 data store. Data source "Mexico Feed" 228 and "Brazil Feed" 238 provide data to a "Transform C" 230 transform. The Transform C 230 transform performs operations on the data provided by the "Mexico Feed" 228 and stores the result in an "Intermediate Dataset 2" 232 data store.

The Intermediate Dataset 1 226 data store and the "Intermediate Dataset 2 232 data store provide data to the "Transform B" 234 transform. The Transform B 234 transform uses the data provided from the Intermediate Dataset 1 226 and the Intermediate dataset 2 232 stores the result in "Output DataSet" 236 data store.

Figure 2C:
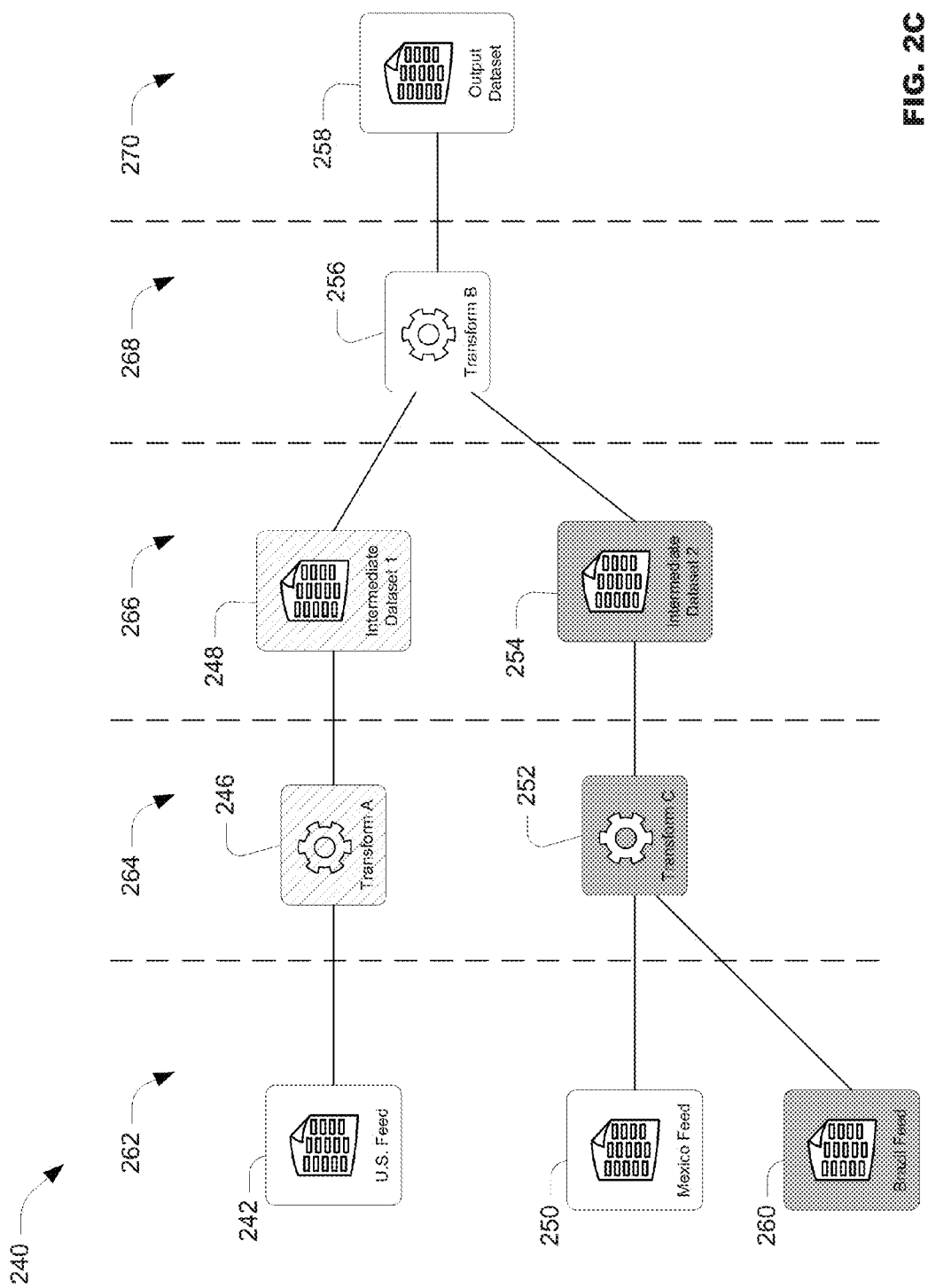

FIG. 2C shows schematic diagram of an example data lineage graph 240 for two versions of metadata describing a data processing system. In this example a comparison of the first version and the second version identified above. The data lineage graph 240 includes indications of differences between the two versions of the metadata. In the illustrated example differences are indicated by shading patterns, which are equivalent to color coding.

In this example, a data source "U.S. Feed" 242 provides data to a "Transform A" 246 transform. The Transform A 246 performs operations on the data provided by the "U.S. Feed" 242 and stores the result in the "Intermediate Dataset 1 " 248 data store. Data sources "Mexico Feed" 250 and "Brazil Feed" 260 provide data to a "Transform C" 252 transform. The Transform C 252 transform performs operations on the data provided by the "Mexico Feed" 250 and stores the result in an "Intermediate Dataset 2" 254 data store.

The Intermediate Dataset 1 248 data store and the "Intermediate Dataset 2 254 data store provide data to the "Transform B" 256 transform. The Transform B 256 transform uses the data provided from the Intermediate Dataset 1 248 and the Intermediate dataset 2 254 stores the result in "Output DataSet" 258 data store.

The shading of nodes 252, 254, 260 indicates that the corresponding component and data store of the data processing system only exists in one of the two versions (e.g., only in the second version) being compared in this representations of the data lineages. For example, in the second version of the underlying data processing system, transform C may remove certain records from the data flow that fail to match certain criteria (e.g., remove all records for customers not residing in Mexico City). In the first version of the underlying data processing system, transform C does not exist so all records, including for Mexico City customers, will be passed on to the next component in the dataflow through the data processing system. The passed on records can be stored in data store 2. The transform B component reflected by node 248 is not shaded, indicating it occurs in both versions. In each version, transform B will perform operations on the records originating from the U.S. Feed, Mexico Feed, and the Bazil Feed to populate the output dataset. The transform B component itself may format the data received from intermediate dataset 1 and either the Mexico Feed (for version 1) or the intermediate dataset 2 (for version 2) for storage or display. For example the, report may include a total of all revenues from product orders in the first version and the report a may include a total of all revenues from product orders by residents of Mexico City in the second version. Although, transform C and the Output dataset are unchanged, their respective outputs may differ between the two versions because the upstream component transform C has been inserted in one version, but not the other. A user reviewing the data lineage graph 240 can easily determine that Transform C is a difference between the two versions being compared and further that the outputs of all components reflected by nodes that are downstream from node may potentially be changed as well even though those nodes themselves are the same between the two versions. Thus, the scope of the impact of a change between the two versions can quickly be assessed.

In some implementations (not shown), nodes for which the output of a corresponding component may change due to upstream changes in the data lineage that have not themselves been changed may be more clearly highlighted adding an additional indication of their status. For example these nodes downstream from a changed node may be shaded or color coded with a second shade or color to more explicitly reflect their status.

For example, transform B (reflected by node 256) may combine information from intermediate data set 1 with intermediate data set 2. This sequence of records is stored in data store 258. The striped shading of node 246 and node 248 indicates that the components reflected by these nodes exist in both versions being compared, but the nodes are different in the two versions. A user reviewing the data lineage graph 200 can easily determine where these differences occur and the scope of the impact of the differences between the two versions.

For example, data lineage graph 240 may be generated by metadata management system 130 and displayed to user 150 through a graphical user interface of user terminal 152 of FIG. 1.

Reports can be generated which identify and highlight differences between the metadata for different components in the system. As discussed further below, a report can be generated that compares datasets based on data sources, datasets, directories, and fields and columns. A report can also be generated that identifies and highlights differences between two versions metadata describing a data processing system identified by a data lineage, as described above. In some implementations, the reports may identify datasets, data components, and transforms based on predetermined sections of the data lineage graph. For example, the first section 262 may be identified as "Ultimate Data Source", the second section 264 may be identified as "Initial Transforms", the third section 266 may be identified as "Intermediate Datasets", the fourth section 268 may be identified as "Secondary Transforms", and the fifth section 270 may be identified as "Reports."

Figure 3A:
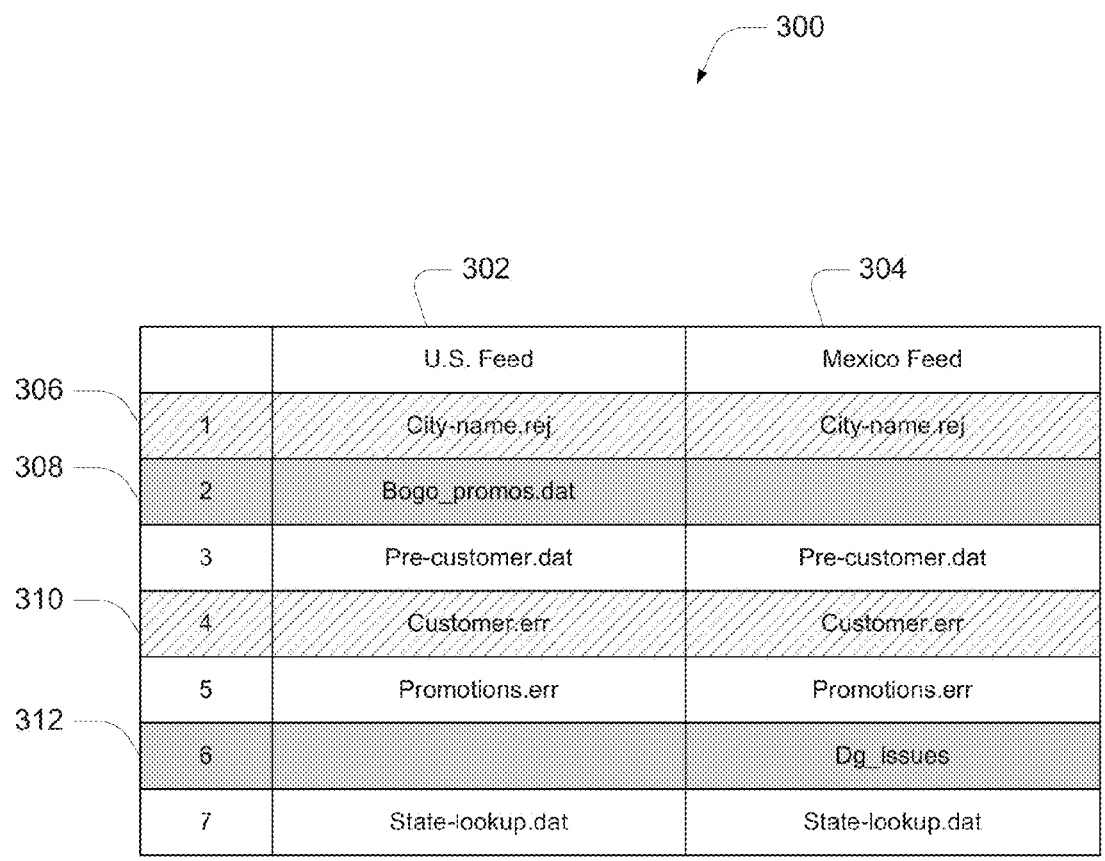
FIG. 3A illustrates an example of a report that compares datasets of two different applications.

FIG. 3A illustrates an example of a report that compares datasets of two different applications based on data sources. The report 300 identifies differences between datasets describing applications in a data processing system. The rows of the report 300 each reflect a data set is used by an application. The columns of the report 300 each reflect applications, in this example, the "U.S. Feed" data source 302 and the "Mexico Feed" data source 304.

Differences between the two versions of datasets that exist in the applications of data processing system that are compared by report 300 are indicated by shading. Striped rows (e.g., striped rows 306 and 310) indicate that a dataset corresponding to the row or column (e.g., the "City-name.rej" dataset and the "Customer.err" dataset) exists in both versions but is different (e.g., modified) between the two versions. Shaded rows and columns (e.g., shaded row 308 and 312) indicate that a dataset corresponding to the row (e.g., the "Bogo_promos.dat" dataset and the "Dg_Issues" dataset) exists only in the one of the two versions compared.

FIG. 3B illustrates an example of a report that compares two datasets. The report 320 identifies differences between datasets describing applications in a data processing system. The rows of the report 320 each reflect a data elements in each of the data sets. The columns of the report 320 each reflect datasets, in this example, two versions of a customer data set, labeled "customer.dat" 322 and "customer.dat(2)" 324.

Differences between the two versions of datasets compared by report 320 are indicated by shading. Striped rows (e.g., striped row 330) indicate that a data element corresponding to the row or column (e.g., the "Cust_birthday" data element) exists in both data sets but is different (e.g., modified) between the two versions. Shaded rows and columns (e.g., shaded row 328 and 332) indicate that a data element corresponding to the row (e.g., the "Main_postcode" dataset and the "Main_zipcode" data element) exists only in the one of the two versions compared.

Figure 3C:
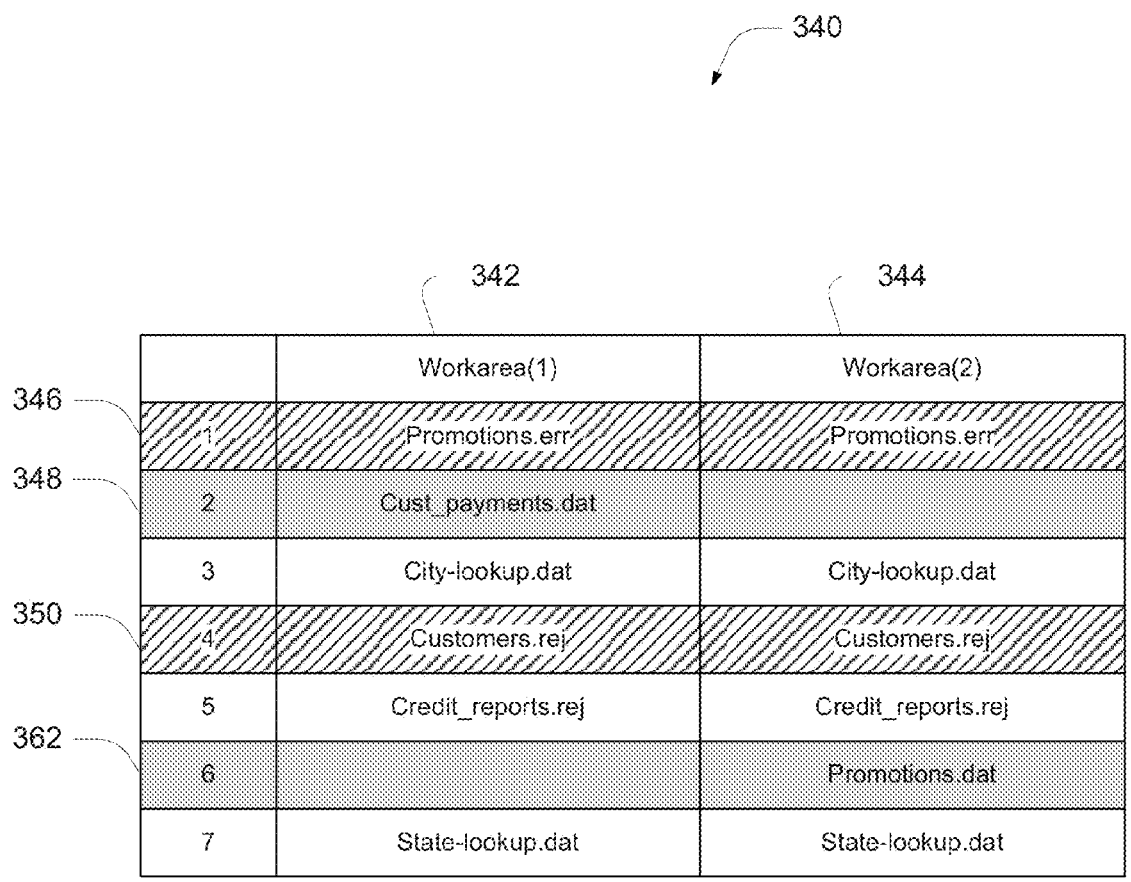
FIG. 3C illustrates an example of a report that compares directories.

FIG. 3C illustrates an example of a report that compares directories. The report 340 identifies differences between directories used by a computer system. The rows of the report 340 each reflect a file stored in the directory. The columns of the report 340 each reflect files in the directories, in this example, the "Workarea(1)" directory 342 and the "Workarea(2)" directory 344.

Differences between the two directories are indicated by shading. Striped rows (e.g., striped rows 346 and 350)

indicate that a file corresponding to the row or column (e.g., the "Promotions.rej" file and the "Customers.rej" file) exists in both versions but are different (e.g., modified) between the two directories. Shaded rows and columns (e.g., shaded row 348 and 352) indicate that a file corresponding to the row (e.g., the "Custpayments.dat" file and the "Promotions.dat" file) exists only in the one of the two directories.

FIG. 3D illustrates an example of a report that compares fields or columns. The report 360 identifies differences between fields or columns in one or more data sets. The rows of the report 360 represent characteristics of the field or column. The characteristics may be identified by an additional column 361. The columns of the report 360 each reflect a field or column in a data set, in this example, the "Cust_Birthday" field 362 and the "Cust_Birthday(2)" field 364.

Differences between the two fields or columns are indicated by shading. Striped rows (e.g., striped rows 366 and 370) indicate that a value for each characteristic corresponding to the row or column (e.g., the "DataSet" characteristics and the "Native Type" characteristic) exists in both fields but are different between the two fields. Shaded rows and columns (e.g., shaded row 368 and 372) indicate that a characteristic corresponding to the row (e.g., the "Default Value" characteristic and the "Business Term" characteristic) exists for only in the one of the two fields.

Figure 3E:
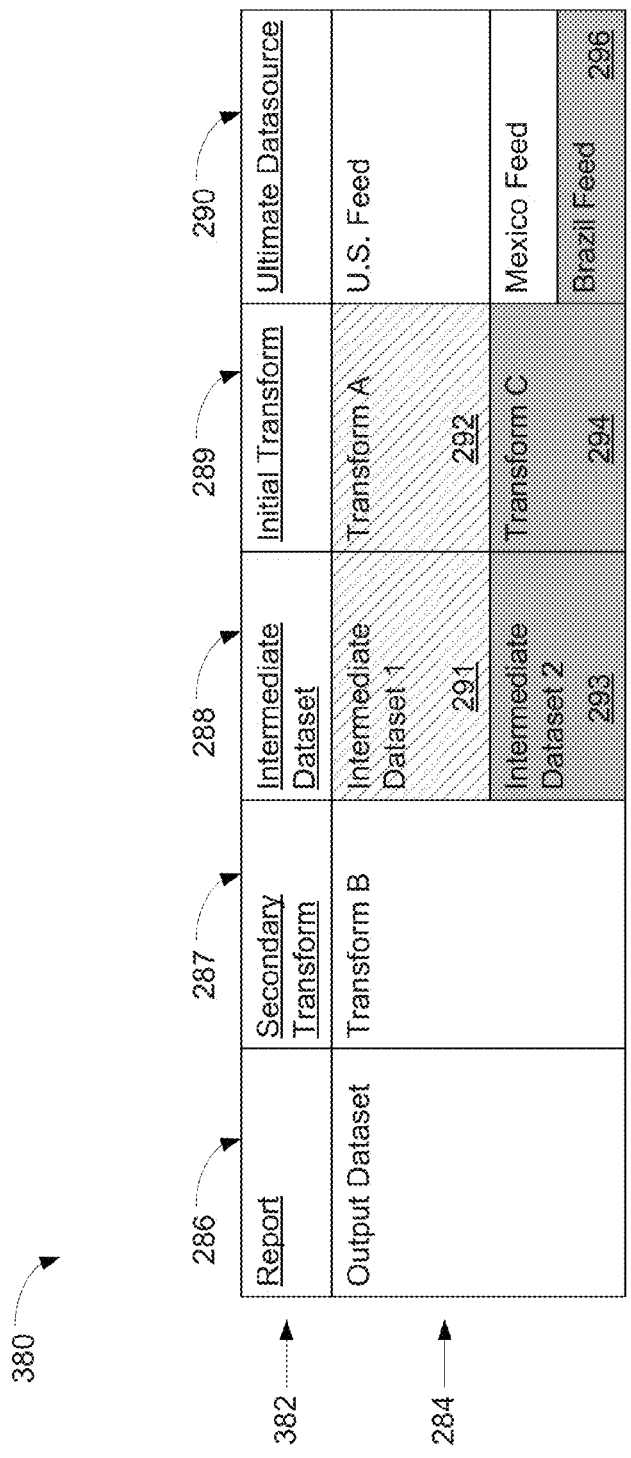
FIG. 3E illustrates an example of a data lineage table reflecting differences between two versions metadata describing a data processing system.

FIG. 3E illustrates an example of a data lineage table 380 reflecting differences between two versions metadata describing a data processing system. In this example, the data lineage table 380 reflects the differences between the data lineage diagram 200 of FIG. 2A and data lineage diagram 220 of FIG. 2B, as reflected in the data lineage diagram 240 of FIG. 2C.

The title row 382 of the table identifies the sections of a data lineage diagram, as described above with respect to FIG. 2C. The first column 286 identifies the components of the data lineage diagram that are related to the report region 262 of the data lineage diagram, the second column 287 identifies the components of the data linage diagram that are related to the secondary transformation section of the data lineage diagram 268. The third column 288 identifies the components of the data lineage diagram that are related to the intermediate dataset section 266. The fourth column 289 identifies the components of the data lineage diagram that are related to the initial transformation section 264, The fifth column 290 identifies the components of the data lineage diagram that are related to the ultimate data source section 262.

The row 284 illustrates the components associated with the output data set. In this example, the size of the field of the output data set expands to be visually identifiable as associated with the Transform B, Intermediate Dataset 1, Intermediate Dataset 2, Transform A, Transform C, U.S. Feed, Mexico Feed, and Brazil Feed. For each field, the size of the field is adjusted to clearly show the relationships between the components. For example, the Mexico Feed and Brazil Feed are associated with Transform C, that is, referring to FIG. 2C, the Mexico feed 250 and Brazil Feed 260 supplies data to Transform C 252. As such, the size of the field 294 for Transform C is large enough to be visually associated with the field for the Mexico Feed and the field 296 for the Brazil feed.

Differences between the two components of the data lineage can be indicated by shading. Striped field (for example, striped fields 291, 292) indicate that the components are present in both versions of the data lineage diagrams, but have been changed in same manner. For example, Intermediate Dataset 1 is present in the data lineage diagram 200 of FIG. 2A as Intermediate Dataset 1 206 and also present in the data lineage diagram 220 of FIG. 2B as Intermediate Dataset 1 226, but there has been some change to the dataset that is reflected in the report.

Solid fields (e.g. solid fields 293, 294, and 296) indicate that the component is only present in one of the data lineage diagrams, or is not present in at least one of the data lineage diagrams if multiple versions are being compared. For example, transform C is present in the data lineage diagram 220 of FIG. 2B but is not present in the data lineage diagram 200 of FIG. 2A.

Figure 4:
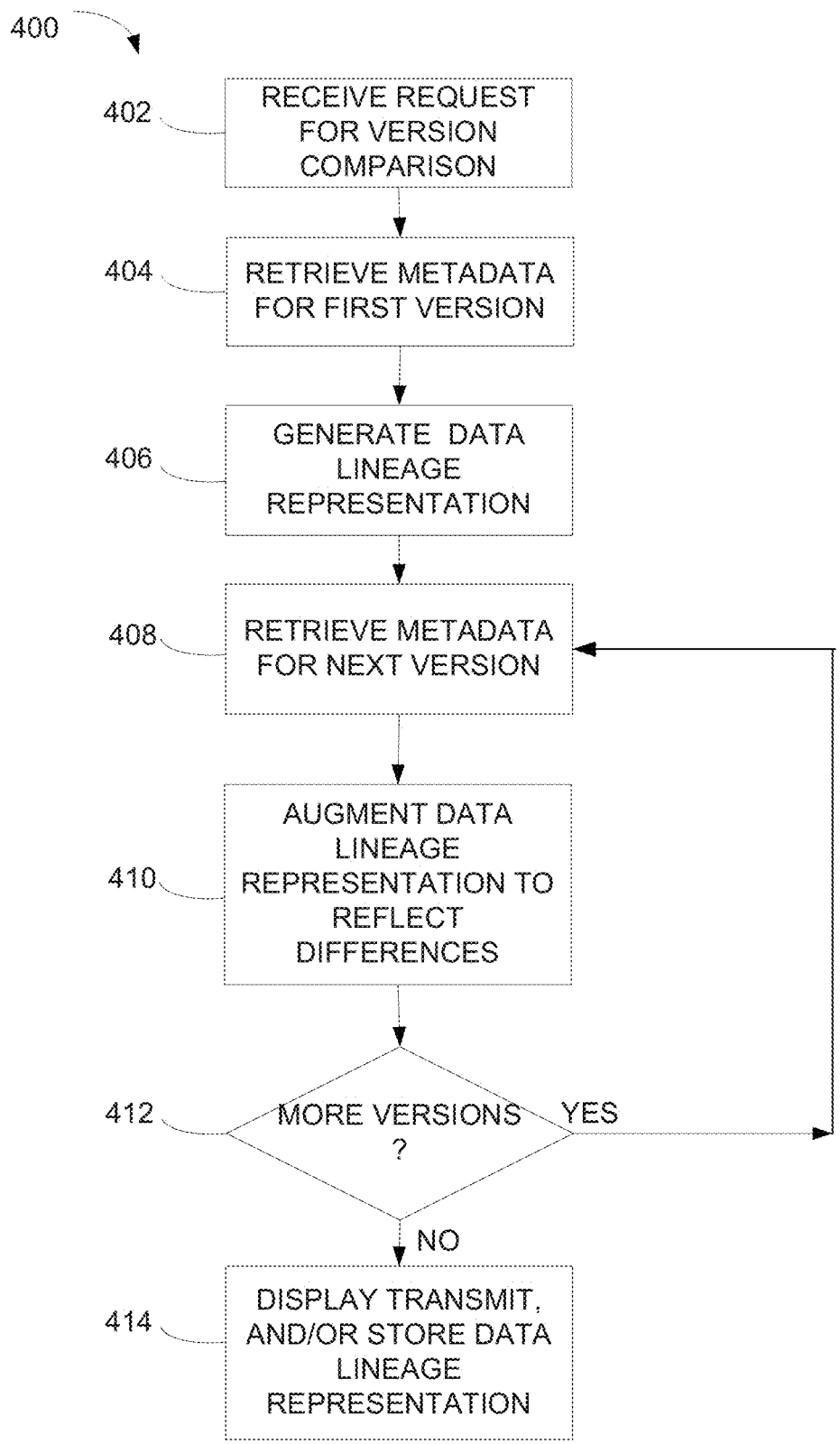
FIG. 4 is a flowchart of an example process for generating a representation of data lineage comparing versions of data processing system.

Metadata for any element of the data lineage may be compared. For example, versions of datasets and data transformation component may be compared. FIG. 4 shows a flowchart for an example metadata version comparison process 400. For example process 400 may be performed by the metadata management system 130 of FIG. 1.

Process 400 may start when a request is received 402 for a version comparison. In some implementations, the request may include an explicit or implicit identification of a base or reference version against which any other version(s) of the will be compared. The request may also include identification of one more additional versions of a data processing system for which metadata is available. In some implementations, the request includes information identifying two or more versions of metadata describing a data processing system without designating a base version. For example, the information identifying a version may include a unique version tag associated with a version of the data processing system.

The versions identified by the request for comparison may have various relationships to one another. In some implementations, a first version of metadata and a second version of metadata have an ancestor-descendant relationship in a revision history. For example, the first version may be a later revision of the second version or the second version may be a later revision of the first version. In some implementations, a first version of metadata and a second version of metadata have a common ancestor in a revision history, but neither version of metadata is a descendent of the other version of metadata. For example, the first version and the second version may correspond to parallel alternate development paths that are both derived from an earlier third version. In some implementations, a first version of metadata and a second version of metadata describe concurrently employed implementations of the data processing system. For example, the first version of metadata may describe an instance of the data processing system that is deployed in a first geographic region (e.g., North America) and the second version of metadata may describe an instance of the data processing system that is deployed in a second geographic region (e.g., Europe). In another example, the first version of metadata may describe a test mode instance of the data processing system and the second version of metadata may describe a production mode instance of the data processing system.

In some implementations, the request is received through a user interface (e.g., graphical user interface) including hardware that is locally connected (e.g., a computer monitor and a keyboard and/or mouse) to a processing device that receives the request. For example, the request may be received 402 through a user interface of the metadata management system 130 of FIG. 1. In some implementations, the request is received by a server through a network interface from a remote processing device. For example, the request may be received 402 through a network interface of the metadata management system 130 from a user terminal 152 operating on a remote processing device.

A first version of metadata describing a data processing system is retrieved 404. In some implementations, metadata for the first version of metadata is accessed using a unique tag for the first version of metadata and a look-up table. For example, a relational database may include a look-up table that lists foreign keys pointing to metadata objects associated with components of the data processing system. In some implementations, metadata objects describing components of a data processing system may include one or more version tags as foreign keys. When retrieving 404 a first version of metadata, the relational data base may be queried to return all metadata objects that include the version tag for the first version. For example, the first version of metadata may be retrieved 404 from the relational database 142 residing on data storage 140 by the metadata management system 130 of FIG. 1.

A representation of dependencies among components in a data processing system is generated 406. The representation may reflect a first data lineage that is based on a first version of metadata describing the data processing system. In some implementations, the representation may include a graph with nodes representing components of the data processing system and directed edges representing data flows between components of the data processing system. For example, FIG. 2 illustrates an example of a data lineage graph that reflects dependencies among the components of a data processing system. In some implementations, the representation may include a table listing components of the data processing system. For example, FIG. 3 illustrates an example of a data lineage table that reflects dependencies among the components of a data processing system. In some implementations, the representation may include a saved file, packets of data transmitted over a network, or other data that reflects dependencies among the components of a data processing system. For example, the representation may be generated 406 by the metadata management system 130 of FIG. 1.

A second version of metadata describing a data processing system is retrieved 408. In some implementations, metadata for the second version of metadata is accessed using a unique tag for the second version of metadata and a look-up table. For example, a relational database may include a look-up table that lists foreign keys pointing to metadata objects associated with components of the data processing system. Some of the foreign keys may point to a metadata object that is associated with a base or reference version of the metadata describing the data processing system. Other foreign keys may point to metadata objects that differ from the base or reference version, because the metadata object for the corresponding component of the data processing system is different for a version associated with the version tag, or because the metadata object corresponds to a component that does not exist in the base or reference version. In some cases, a metadata object that exists in a base or reference version may not exist in a version associated with the version tag.

In some implementations, a version tag is implicitly associated with all metadata objects of a base or reference version, unless explicitly overridden by values in a look-up table associated with the version tag. For example, look-up table entries for version tag may encode only differences from a base version. Where a metadata object describing a component is omitted in the base version, the look-up table may include an entry with a foreign key pointing to the metadata object. Where a metadata object describing a component is modified (relative to the base version) in the version associated with the version tag, the look-up table may include an entry with foreign keys pointing to both the metadata object associated with the base version and the metadata object associated with the version tag. Where a metadata object describing a component is omitted in the version associated with the version tag, the look-up table may include an entry with a foreign key pointing to the metadata object associated with the base version and a null key reflecting the deletion.

In some implementations, there may be no base or reference version and each version tag is associated with a set of foreign keys that point to an arbitrary collection of metadata objects associated with that particular version.

For example, the first version of metadata may be retrieved 404 from the relational database 142 residing on data storage 140 by the metadata management system 130 of FIG. 1.

The representation of dependencies among components in the data processing system is augmented 410 to reflect differences between the first data lineage and a second data lineage that is based on a second version of metadata describing the data processing system. In some implementations, differences may be detected by comparing lists of foreign keys pointing to metadata objects associated with respective version tags of two versions. In some implementations, differences may be detected by reading a list of foreign keys pointing to metadata objects for the second version alone, where the list has been generated and/or stored in format that explicitly indicates differences from the first version, which is a base or reference version. In some implementations, differences are detected by directly comparing metadata objects associated with two respective version tags.

Differences may be reflected in the representation in various ways. For example, certain elements of the representation may be color coded to reflect the deletion or modification (relative to the first version) of metadata object describing a component of the data processing system. Indications or other data reflecting additional (e.g., new) metadata objects (relative to the first version) may be added to the representation. In some implementations, the representation includes a data lineage graph and differences between two versions of metadata are at least in part reflected by color-coding of nodes to indicate which components have changed between the first version of metadata and the second version of metadata. In some implementations, differences between the two versions of metadata are at least in part reflected by color-coding of nodes to indicate for which components output will be changed between the first version of metadata and the second version of metadata due to upstream changes in a data lineage. For example, a first color (e.g., yellow) may be applied to nodes reflecting metadata objects that are themselves modified in the second version (relative to the first version) and a second color (e.g., red) may be applied to nodes reflecting metadata objects that have not themselves been modified, but could generate different outputs due to an upstream change in a data lineage.

In some implementations, the representation includes a data lineage table and differences between two versions of metadata are at least in part reflected by color-coding of cells in the table to indicate which components have changed between the first version of metadata and the second version of metadata. In some implementations, differences between two versions of metadata are at least in part reflected by color-coding of cells in the table to indicate for which components output will be changed between the first version of metadata and the second version of metadata due to upstream changes in a data lineage. For example, a first color (e.g., yellow) may be applied to cells reflecting metadata objects that are themselves modified in the second version (relative to the first version) and a second color (e.g., red) may be applied to cells (e.g., a single cell indicating the upstream dependency or a row or column of cells associated with the impacted metadata) reflecting metadata objects that have not themselves been modified, but could generate different outputs due to an upstream change in a data lineage.

In some implementations, differences reflected in the representation are limited to structural differences in the first version of metadata and the second version of metadata. For example, a change in a comments portion of a metadata object may be filtered out and not reflected in the representation, while a structural (e.g., substantive) change in a metadata object that may impact data processing may be reflected in the representation.

For example, the representation may be augmented 410 by the metadata management system 130 of FIG. 1.

Processing of the request for comparison of versions may continue until 412 all of the versions identified by the request have been compared to at least one other version. For example, the representation may be further augmented to reflect differences between the first data lineage and a third data lineage that is based on a third version of metadata describing the data processing system. In some implementations, each version other than the first version may be compared to the first version (e.g., a designated base or reference version).

Once all identified versions have been compared and the representation has been augmented to reflect those comparisons 412, the representation may be stored, transmitted, and/or displayed 714. For example, the representation may include a file that may read and used to generate a data lineage graph or a data lineage table and the file may be stored in by metadata management system 120 in data storage 140 of FIG. 1. In some implementations, the representation may be encoded in payload of one or more network protocol messages that are transmitted (e.g., to user terminal 152) over an electronic communication network (e.g., through a network interface of metadata management system 130). In some implementations, the representation may be displayed to a user through a graphical user interface. For example, the representation may be displayed as a data lineage graph or a data lineage table to user 150 through a graphical user interface of user terminal 152.

The metadata version comparison approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a tangible, non-transitory storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. It bears emphasis that the details of the particular data processing regarding product orders that are described in the examples of FIGS. 2 and 3 and referenced throughout this specification only to illustrate capabilities of the metadata management system and associated processes. The details of the particular data processing system presented are not essential features and should not be construed to limit the scope of the claims. Other embodiments are within the scope of the following claims.

What is claimed is:

1. A method, performed by one or more data processing apparatus including:
   receiving user input selecting a first node in a first graph that includes nodes;
   receiving a first data lineage of a first object associated with the first node, the first object having a type, the first data lineage describing relationships between the first object and one or more datasets or transforms;
   receiving user input selecting a second node from a second graph that includes nodes;
   receiving a second data lineage of a second object associated with the second node, the second object having the same type as the first object, the second data lineage describing relationships between the second object and one or more other datasets or transforms;
   performing a comparison of the first node selected from the first graph and the first data lineage to the second node selected from the second graph and the second data lineage; and
   generating a report based on the comparison.

2. The method of claim 1, wherein the type of the first node is one of a group consisting of a field of a dataset, a column of a dataset, a dataset, or a transformation.

3. The method of claim 1, wherein a graph includes nodes representing components of a data processing system and directed edges representing data flows between components of the data processing system.

4. The method of claim 1, in which the report specifies structural differences in between the first object and the second object.

5. The method of claim 1, wherein the first object is a first version of an object and the second object is a second version of the object.

6. The method of claim 5, further including:
accessing the first version of the object using a unique tag for the first version of object and a look-up table; and
accessing the second version of the object using a unique tag for the second version of the object and a look-up table.

7. The method of claim 5, in which the first version of the object and the second version of the object have an ancestor-descendant relationship in a revision history.

8. The method of claim 5, in which the first version of the object and the second version of the object have a common ancestor in a revision history, in which the first version of the object is not a descendent in the revision history of the second version of the object, and in which the second version of the object is not a descendent in the revision history of the first version of the object.

9. The method of claim 5, in which the first version of the object and the second version of the object describe respective first and second implementations of a data processing system that are implemented concurrently.

10. A non-transitory computer storage medium encoded with computer program instructions that when executed by one or more computers cause the one or more computers to perform operations comprising:
receiving user input selecting a first node in a first graph that includes nodes;
receiving a first data lineage of a first object associated with the first node, the first object having a type, the first data lineage describing relationships between the first object and one or more datasets or transforms;
receiving user input selecting a second node from a second graph that includes nodes;
receiving a second data lineage of a second object associated with the second node, the second object having the same type as the first object, the second data lineage describing relationships between the second object and one or more other datasets or transforms;
performing a comparison of the first node selected from the first graph and the first data lineage to the second node selected from the second graph and the second data lineage; and
generating a report based on the comparison.

11. The medium of claim 10, wherein the type of the first node is one of a group consisting of a field of a dataset, a column of a dataset, a dataset, or a transformation.

12. The medium of claim 10, wherein a graph includes nodes representing components of a data processing system and directed edges representing data flows between components of the data processing system.

13. The medium of claim 10, in which the report specifies structural differences in between the first object and the second object.

14. The medium of claim 10, wherein the first object is a first version of an object and the second object is a second version of the object.

15. The medium of claim 14, further including:
accessing the first version of the object using a unique tag for the first version of object and a look-up table; and
accessing the second version of the object using a unique tag for the second version of the object and a look-up table.

16. The medium of claim 14, in which the first version of the object and the second version of the object have an ancestor-descendant relationship in a revision history.

17. The medium of claim 14, in which the first version of the object and the second version of the object have a common ancestor in a revision history, in which the first version of the object is not a descendent in the revision history of the second version of the object, and in which the second version of the object is not a descendent in the revision history of the first version of the object.

18. The medium of claim 14, in which the first version of the object and the second version of the object describe respective first and second implementations of a data processing system that are implemented concurrently.

19. A system comprising:
one or more computers and one or more storage devices storing instructions that are operable, when executed by the one or more computers, to cause the one or more computers to perform operations comprising:
receiving user input selecting a first node in a first graph that includes nodes;
receiving a first data lineage of a first object associated with the first node, the first object having a type, the first data lineage describing relationships between the first object and one or more datasets or transforms;
receiving user input selecting a second node from a second graph that includes nodes;
receiving a second data lineage of a second object associated with the second node, the second object having the same type as the first object, the second data lineage describing relationships between the second object and one or more other datasets or transforms;
performing a comparison of the first node selected from the first graph and the first data lineage to the second node selected from the second graph and the second data lineage; and
generating a report based on the comparison.

20. The system of claim 19, wherein the type of the first node is one of a group consisting of a field of a dataset, a column of a dataset, a dataset, or a transformation.

21. The system of claim 19, wherein a graph includes nodes representing components of a data processing system and directed edges representing data flows between components of the data processing system.

22. The system of claim 19, in which the report specifies structural differences in between the first object and the second object.

23. The system of claim 19, wherein the first object is a first version of an object and the second object is a second version of the object.

24. The system of claim 23, further including:
accessing the first version of the object using a unique tag for the first version of object and a look-up table; and
accessing the second version of the object using a unique tag for the second version of the object and a look-up table.

25. The system of claim 23, in which the first version of the object and the second version of the object have an ancestor-descendant relationship in a revision history.

26. The system of claim 23, in which the first version of the object and the second version of the object have a common ancestor in a revision history, in which the first version of the object is not a descendent in the revision history of the second version of the object, and in which the second version of the object is not a descendent in the revision history of the first version of the object.

27. The system of claim 23, in which the first version of the object and the second version of the object describe respective first and second implementations of a data processing system that are implemented concurrently.

28. A system comprising:
one or more computers and one or more storage devices storing instructions that are operable, when executed by the one or more computers, to cause the one or more computers to perform operations comprising:
means for receiving user input selecting a first node in a first graph that includes nodes; means for receiving a first data lineage of a first object associated with the first node, the first object having a type, the first data lineage describing relationships between the first object and one or more datasets or transforms;
means for receiving user input selecting a second node from a second graph that includes nodes;
means for receiving a second data lineage of a second object associated with the second node, the second object having the same type as the first object, the second data lineage describing relationships between the second object and one or more other datasets or transforms;
means for performing a comparison of the first node selected from the first graph and the first data lineage to the second node selected from the second graph and the second data lineage; and
means for generating a report based on the comparison.

* * * * *